United States Patent
Said et al.

(10) Patent No.: US 10,999,408 B2
(45) Date of Patent: May 4, 2021

(54) AUTOMATED CLOUD COMPUTING TENANT DEPLOYMENT SERVICE

(71) Applicant: SAP SE, Walldorf (DE)

(72) Inventors: Baré Said, St. Leon (DE); Jan Teichmann, Neustadt/Weinstrasse (DE)

(73) Assignee: SAP SE, Walldorf (DE)

( * ) Notice: Subject to any disclaimer, the term of this patent is extended or adjusted under 35 U.S.C. 154(b) by 16 days.

(21) Appl. No.: 16/376,896

(22) Filed: Apr. 5, 2019

(65) Prior Publication Data

US 2020/0322453 A1 Oct. 8, 2020

(51) Int. Cl.
*H04L 29/08* (2006.01)
*G06F 8/60* (2018.01)

(52) U.S. Cl.
CPC ............... *H04L 67/34* (2013.01); *G06F 8/60* (2013.01); *H04L 67/1097* (2013.01)

(58) Field of Classification Search
CPC . H04L 67/34; H04L 67/1097; H04L 67/2809; H04L 67/2838; H04L 67/148; H04L 67/10; H04L 41/5012; H04L 41/5025; G06F 8/60
See application file for complete search history.

(56) References Cited

U.S. PATENT DOCUMENTS

| | | | |
|---|---|---|---|
| 2006/0010236 A1* | 1/2006 | Meiser | H04L 67/306 709/226 |
| 2018/0115468 A1* | 4/2018 | Bildhauer | H04L 41/5019 |
| 2019/0121675 A1* | 4/2019 | Smola | G06F 9/5083 |
| 2019/0222988 A1* | 7/2019 | Maes | H04L 41/5035 |

* cited by examiner

*Primary Examiner* — Jonathan A Bui
*Assistant Examiner* — Mohammad Yousuf A. Mian
(74) *Attorney, Agent, or Firm* — Klarquist Sparkman, LLP

(57) ABSTRACT

Techniques and solutions are described for facilitating deploying tenants to, and managing tenants in, a cloud computing environment. In determining where a tenant should be deployed, cloud-based software applications, or at least cloud-based software applications of a particular type, used by the tenant are considered. Computing resources needed by the tenant are determined. The tenant is deployed to a computing infrastructure that has instances of the cloud-based software applications used by the tenant and has computing resources sufficient to satisfy the needs of the tenant. If the tenant is to access another software application, the data for such application is deployed to that computing infrastructure. If the tenant's computing resource needs exceed the available resources of the infrastructure, resources are added to the infrastructure or the tenant's data for all of the cloud-based software applications are moved to another computing infrastructure.

20 Claims, 10 Drawing Sheets

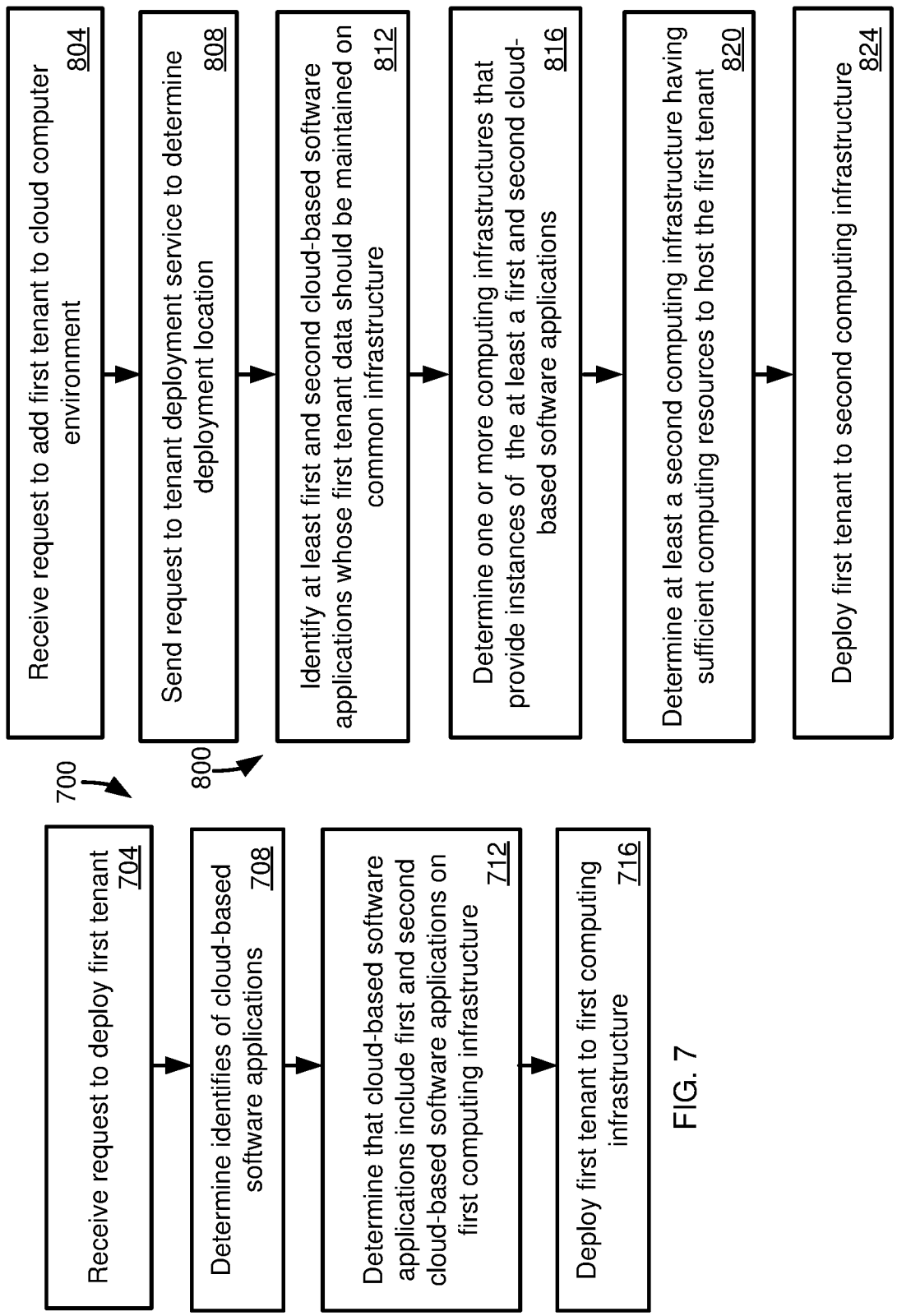

AUTOMATED CLOUD COMPUTING TENANT DEPLOYMENT SERVICE

FIELD

The present disclosure generally relates to configuring cloud computing environments. Particular implementations relate to managing the distribution of tenants between multiple database instances in the cloud computing environment.

BACKGROUND

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. Other tenant resources (e.g., data) can be maintained in the same database instance, but separated from other tenants, such that a given tenant cannot access the data of another tenant. Yet further resources (e.g., data) can be maintained locally by a tenant.

Similar scenarios may exist in other contexts. For instance, a large organization may have multiple systems (e.g., development, test, and production systems) that share resources (e.g., a software stack). Other components of the systems may differ, and thus can be analogous to tenants in a multitenant architecture. Similarly, a large organization may maintain common resources, but have distinct resources for particular regions, operating units, facilities, etc., which can be similar to tenants in a multitenant architecture.

In managing an environment with multiple database instances, various criteria can be used to determine where a particular tenant should be deployed, and when a deployment configuration should be changed. Existing techniques may provide suboptimal performance. Accordingly, room for improvement exists in managing multitenant database systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating deploying tenants to, and managing tenants in, a cloud computing environment. In determining where a tenant should be deployed, cloud-based software applications, or at least cloud-based software applications of a particular type, used by the tenant are considered. Computing resources needed by the tenant are determined. The tenant is deployed to a computing infrastructure that has instances of the cloud-based software applications used by the tenant and has computing resources sufficient to satisfy the needs of the tenant. If the tenant is to access another software application, the data for such application is deployed to that computing infrastructure. If the tenant's computing resource needs exceed the available computing resources of the infrastructure, computing resources are added to the infrastructure or, if a suitable computing infrastructure is available, the tenant's data for all of the cloud-based software applications are moved to such other computing infrastructure. Disclosed techniques can facilitate hosting tenant data for a plurality of applications on common computing infrastructure, which can facilitate applications that use data from multiple such applications, such as facilitating the use of analytical or visualization application.

In one aspect, a method is provided for deploying a tenant to an infrastructure of a cloud computing environment. A request is received to deploy a first tenant to a cloud computing environment that includes first and second computing infrastructures. The first tenant is designated to have access to a first plurality of cloud-based software applications. The first computing infrastructure includes a first instance of a first cloud-based software application and a first instance of a second cloud-based software application. The second computing infrastructure includes a second instance of the first cloud-based software application. The first cloud-based software application is different than the second cloud-based software application.

Identities of cloud-based software applications of the first plurality of cloud-based software applications are determined. It is determined that the first plurality of cloud-based software applications includes the first cloud-based software application and the second cloud-based software application. Based on the determining that the first plurality of cloud-based software applications includes the first cloud-based software application and the second cloud-based software application, the first tenant is deployed to the first computing infrastructure.

In another aspect, in another disclosed method for deploying a tenant to an infrastructure of a cloud computing environment, a request is received to add a first tenant to the cloud computing environment. The request specifies a first plurality of cloud-based software applications to be used by the first tenant. A request is sent to a tenant deployment service to determine a computing infrastructure on which the first tenant should be deployed. At least a first cloud-based software application and at least a second cloud-based software application are identified whose data for the first tenant is designated to be maintained on a common computing infrastructure of the plurality of computing infrastructures.

The tenant deployment service determines one or more computing infrastructures of the plurality of computing infrastructures that provide instances of the first cloud-based software application and the second cloud-based software application. The tenant deployment service determines at least a second computing infrastructure of the one or more computing infrastructures that has sufficient available computing resources to host the first tenant. The first tenant is deployed to the at least a second computing infrastructure.

In a further aspect, a method for deploying a tenant to an infrastructure of a cloud computing environment includes creating a computing environment directory that includes identifiers for a plurality of computing infrastructures of a cloud computing environment, information sufficient to determine available computing resources of respective computing infrastructures, and identifiers of a plurality of cloud-based software applications installed on respective computing infrastructures. A request is received to deploy a first tenant to the cloud computing environment. Cloud-based software applications to be used by the first tenant and computing resources required by the first tenant are determined. The computing environment directory is consulted to determine one or more of the plurality of computing infrastructures having instances of the cloud-based software application to be used by the first tenant and having sufficient computing resources to satisfy the computing resources required by the first tenant. The first tenant is deployed to a computing infrastructure of the one or more computing infrastructures.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 is a flowchart illustrating operations according to a disclosed tenant deployment method.

FIG. 8 is a flowchart illustrating operations for deploying a tenant to a cloud computing environment using a tenant deployment service.

DETAILED DESCRIPTION

Example 1—Overview

Figure 1:
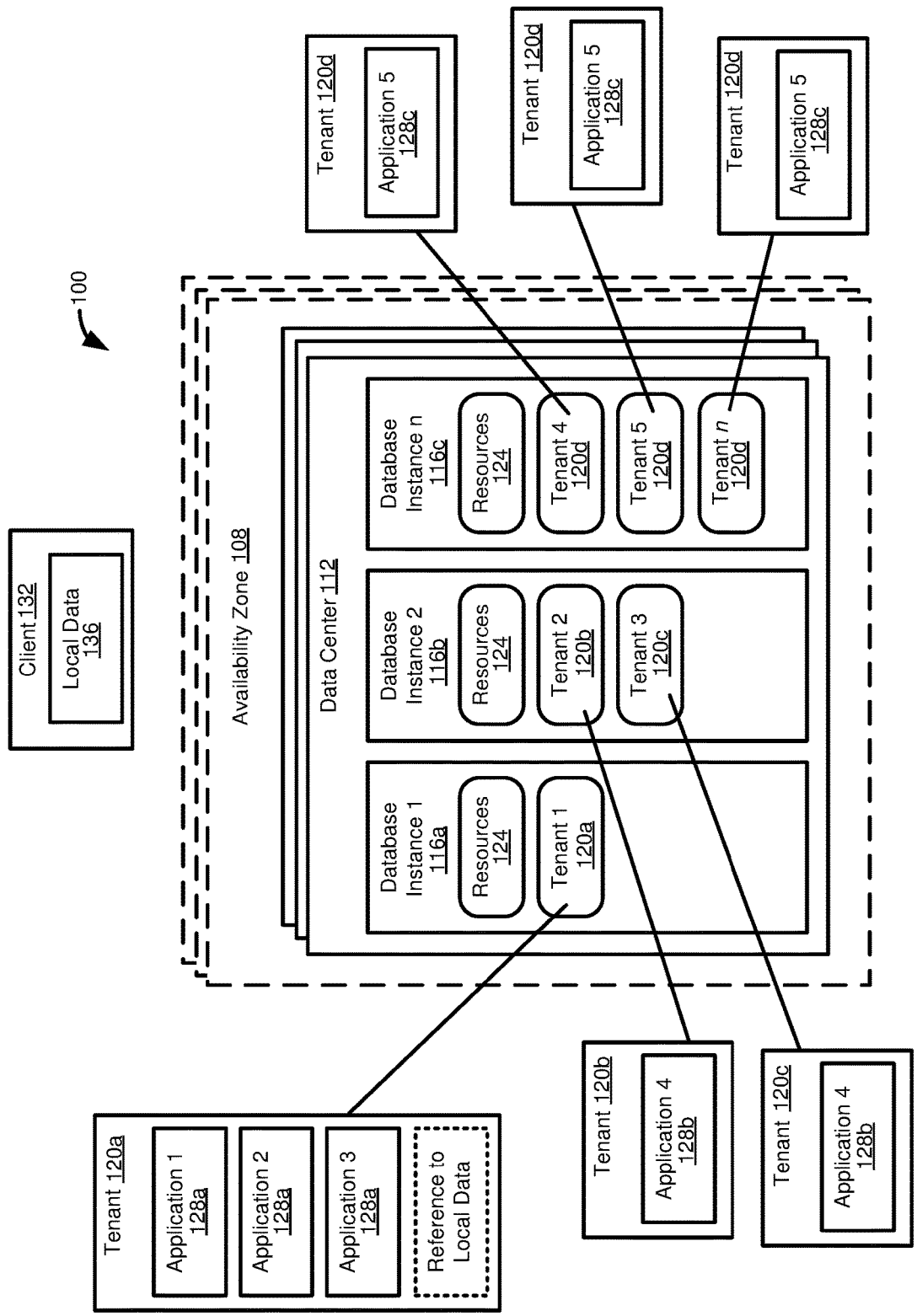
FIG. 1 is a diagram illustrating a computing environment that includes a plurality of available zones and data centers, where a data center includes a plurality of computing infrastructures that can host cloud-based software applications and database instances to which one or more tenants can be deployed.

Multitenant database systems are becoming increasingly common, particularly in cloud deployments. Multitenant environments can provide a number of advantages, including reducing hardware and maintenance costs for users (tenants). In a multitenant environment, some resources, such as documentation, a centralized code base, and at least certain runtime and configuration data, are typically shared by multiple tenants. Other tenant resources (e.g., data) can be maintained in the same database instance, but separated from other tenants, such that a given tenant cannot access the data of another tenant. Yet further resources (e.g., data) can be maintained locally by a tenant.

Similar scenarios may exist in other contexts. For instance, a large organization may have multiple systems (e.g., development, test, and production systems) that share resources (e.g., a software stack). Other components of the systems may differ, and thus can be analogous to tenants in a multitenant architecture. Similarly, a large organization may maintain common resources, but have distinct resources for particular regions, operating units, facilities, etc., which can be similar to tenants in a multitenant architecture.

In managing an environment with multiple database instances, various criteria can be used to determine where a particular tenant should be deployed, and when a deployment configuration should be changed. Existing techniques may provide suboptimal performance. Accordingly, room for improvement exists in managing multitenant database systems.

Considerations for deploying tenants can consider, and prioritize, various factors, such as cost, performance, scalability, high-availability, or simplicity. Many existing rules for deploying tenants favor minimizing costs. Costs can be, for example, the cost of hardware (e.g., cost can be reduced by maximizing the use of each database instance, even if performance or other factors are negatively affected). Costs can also include costs incurred in updating, upgrading, or maintaining a computing environment. For example, if the computing environment includes multiple instances of a software application, additional effort may be required to maintain and update the multiple instances.

While some cloud deployments may be for a single software application, it is increasingly common for cloud deployments to provide multiple software applications on the same infrastructure. Providing multiple applications on the same infrastructure can provide benefits, but can also complicate system configuration. For example, there may be a tradeoff between maintaining tenant data for applications used by a given tenant on the same database instance, or maintaining data for all (or at least multiple) tenants of a given application on the same database instance. That is, for example, assume that a cloud environment includes two database instances, has two tenants (or "users," such as business entities), and provides two applications. In one configuration, the first database instance may be selected to run the first application, the second database instance may be selected to run the second application, and both tenants are hosted on both database instances (e.g., both tenants access the first application on the first database instance and access the second application on the second database instance). In another configuration, the first database instance and the second database instance can each run the first application and the second application, with the first tenant being assigned to the first database instance and the second tenant being assigned to the second database instance.

Examples of typical tenant deployment rules include:
Deploy all tenants with less than a threshold number of users on infrastructure A (one or more computing devices that may host one or more database instances), and deploy larger tenants on infrastructure B (which may have a larger amount of resources, such as memory, which can be particularly beneficial for in-memory database systems, such as SAP HANA of SAP SE, of Walldorf, Germany) This option can maximize the number of tenants on particular infrastructure, which can help optimize cost.
Deploy all tenants with only cloud-hosted data on infrastructure A, and deploy tenants with local data and cloud-hosted data on infrastructure B. This configuration helps maintain tenants with consistent use patterns on the same infrastructure, which can help optimize scalability, performance, and cost.
Mix all tenants on the same infrastructure, which helps optimize cost and simplicity, such as by reducing the number of systems in small data centers.

Keep all tenants of one application on the same infrastructure as long as possible. In this case, as long as possible can mean as long as the tenants do not require more resources than those available on the infrastructure. This arrangement can help minimize the number of application deployments, which can help optimize cost and simplicity.

Typically, as mentioned above, cloud deployments are configured to reduce cost, which can include cost to maintain, update, or upgrade applications. Thus, the fewer the number of installations of a particular application, the easier it is to maintain, update, or upgrade the application. However, as data processing becomes more integrated into the operation of entities, it is more common for a single application, such as a data visualization or analytics application, to access data from multiple data sources (which can be associated, for example, with other applications). If application data resides on multiple database instances, cost are incurred in requesting and receiving data, including due to network delays. These delays can be significant, even if all of the relevant database instances are located in the same data center.

Disclosed technologies configure tenant deployments in a multiple-infrastructure environment (e.g., a data center) to maintain application data of one tenant, for multiple applications, on the same infrastructure as long as possible, such as to facilitate the use of visualization or analytics applications that access tenant data associated with multiple applications. As long as possible can be as long as the resources of the infrastructure are sufficient for the tenant. Deployments made according to this principle can facilitate cross-application data access for a given tenant.

A deployment service can apply the above principle to manage a collection of database instances operating on one or more computing devices, such as a collection of computing devices in a data center. The deployment service can determine an initial deployment of a given set of tenants. The deployment service can be given various constraints, such as the definition of the data center (e.g., which machines are in the data center, which machines will form a cluster to provide a unified infrastructure), which applications are permitted to run on the data center, which applications are permitted to run on particular computing devices (or collections of computing devices, which can be referred to as clusters), a number of instances of a given software application that may be executed on a given machine, cluster, or data center, combinations of these constraints, or other or additional constraints.

The deployment service can also determine how additional tenants should be deployed into a cloud computing environment, or how the cloud computing environment should be adapted to account for new applications accessed by an existing tenant. Similarly, the deployment service can determine if the configuration of the cloud computing environment should be changed based on changes in use over time, such as a particular tenant requiring a larger amount of data, which may exceed the resources of a particular database instance, or a particular tenant reducing an amount of data for a particular application. When a configuration is changed, the change can be based at least in part on attempting to keep data for all applications used by a tenant on a common database instance.

In at least some cases, some tenants may be associated with configuration rules other than "keep data for all applications of a tenant on the same instance," or may have rules that are prioritized or weighted. Configuring or updating a data center (or other environment having a plurality of database instances) can account for different rules of different tenants (e.g., if one tenant does not "care" about keeping its application data together on the same instance, its application data can be deployed on different instances, particularly if doing so facilitates keeping application data on the same instance for tenants where that consideration is a priority). Similarly, a given tenant can use a plurality of applications, but it may only be a priority to keep application data on the same database instance for a subset of the plurality of applications, such as applications whose data is accessed by a visualization or analytics application or tool. The subset can be based on a type associated with the applications (e.g., in metadata for the application), or by comparing an identifier for an application with a list of applications to which the deployment rule applies.

Example 2—Example Computing Environment with Availability Zones and Data Centers FIG. 1 illustrates an environment 100 (e.g., a cloud computing environment) that includes a plurality of availability zones 108. One or more data centers 112 can be located in a given availability zone 108. Each data center 112 can host one or more database instances 116. Typically, at least a portion of the database instances 116 are replicated between data centers 112 in a given availability zone 108. Database instances 116 may also be replicated between availability zones 108.

As will be further described, a database instance 116 refers to a single copy of application code that implements the database, which can include both a data management system (e.g., a RDBMS) and software applications that use services provided by the data management system. In at least some cases, the database can include an application layer and a database layer. Application data can be stored in the database layer. Data for different applications can be maintained in the same database system, or can be maintained in different database systems or different database system containers.

As shown in FIG. 1, a single database instance 116 can host one or more tenants 120. A tenant 120 typically represents a discrete entity, which may have many end users who can access (or act on behalf of) the tenant. A database instance 116 that includes multiple tenants 120 can be referred to as a multi-tenant database system. In FIG. 1, database instance 116a has a single tenant 120a, which may be because database instance 116a is dedicated to that tenant (in which case, it is not, at least at that point, a multitenant database system), or because, while the database instance 116a is capable of, and configured to, support multiple tenants, a second tenant has not yet been deployed to the database instance 116a. A database instance 116b includes tenants 120b and 120c, while database instance 116c is a generalized depiction of a multitenant database instance having n (n is a positive integer) tenants 120d.

Each of the database instances 116 is associated with resources 124, which can be computing resources such as main memory (e.g., volatile memory, or RAM), cache memory, processing resources (one or more real or virtual processors), persistent storage (e.g., ROM, hard disk, solid state disk drives, etc.), network resources, or other computing resources. The computing resources are provided by computing infrastructure on which that database instance 116 is installed. In some cases, resources 124 can be equally allocated to tenants 120 on that instance (e.g., the resources are managed treating the tenants as co-equal members of a group), or can be preferentially allocated to one or more tenants. In some cases, the resources 124 can be all of the resources of a particular computing infrastructure (a single machine or a cluster of multiple machines). In yet another case, the resources 124 can be a portion of the resources of a particular computing infrastructure. For example, multiple database instances 116 can be installed on a single computing infrastructure.

A tenant 120 may have data associated with one or more applications 128. That is, in the case of multiple applications 128, the tenant 120 may have data that is jointly accessible by multiple applications used by the tenant, or may have multiple applications, each with data that can only be accessed with a particular application. In at least some cases, a database instance 116 can host both application data and an instance of the application 128 that accesses the data. The environment 100 can thus provide a cloud-hosted database, as well as cloud-hosted applications 128 that access the database.

As explained in Example 1, typically, multi-instance database deployments are not configured to prioritize deploying all application data (and possibly applications 128) used by a given tenant 120 on a common database instance 116. On the contrary, at least one typical configuration rule seeks to minimize the number of installations of an application 128, and tries to place the data of many tenants that use the application on the same database instance 116. FIG. 1 illustrates both of these scenarios.

Tenant 120a of database instance 116a is shown having data for three applications 128a all on the instance 116a. In contrast, database instances 116b, 116c have been configured to prioritize keeping data for a particular application together, rather than keeping tenant data together. Database instance 116b has been configured to host data for an application 128b, and so the data for application 128b of both tenants 120b and 120c are maintained on the database instance 116b. Similarly, database instance 116c has been configured to host data for an application 128c, and so the data for application 128c of tenants 120d are maintained on database instance 116c.

In some cases, all of the data associated with a particular application 128 (e.g., one of 128a-128c) for a particular tenant 116 can be maintained for the tenant in one or more data centers 112 (e.g., can be cloud-hosted). In other cases, a tenant 116 can have some data (e.g., data used by a particular application 128, such as local data 136) hosted in one or more data centers 112, and some data can be maintained elsewhere, including locally at a client system 132. As explained in Example 1, in at least some cases, whether a given tenant 120 has local data 136 can be used as a criterion in configuring the environment 100, such as on which instance 116 a given tenant should be placed within a particular data center 112.

Figure 2:
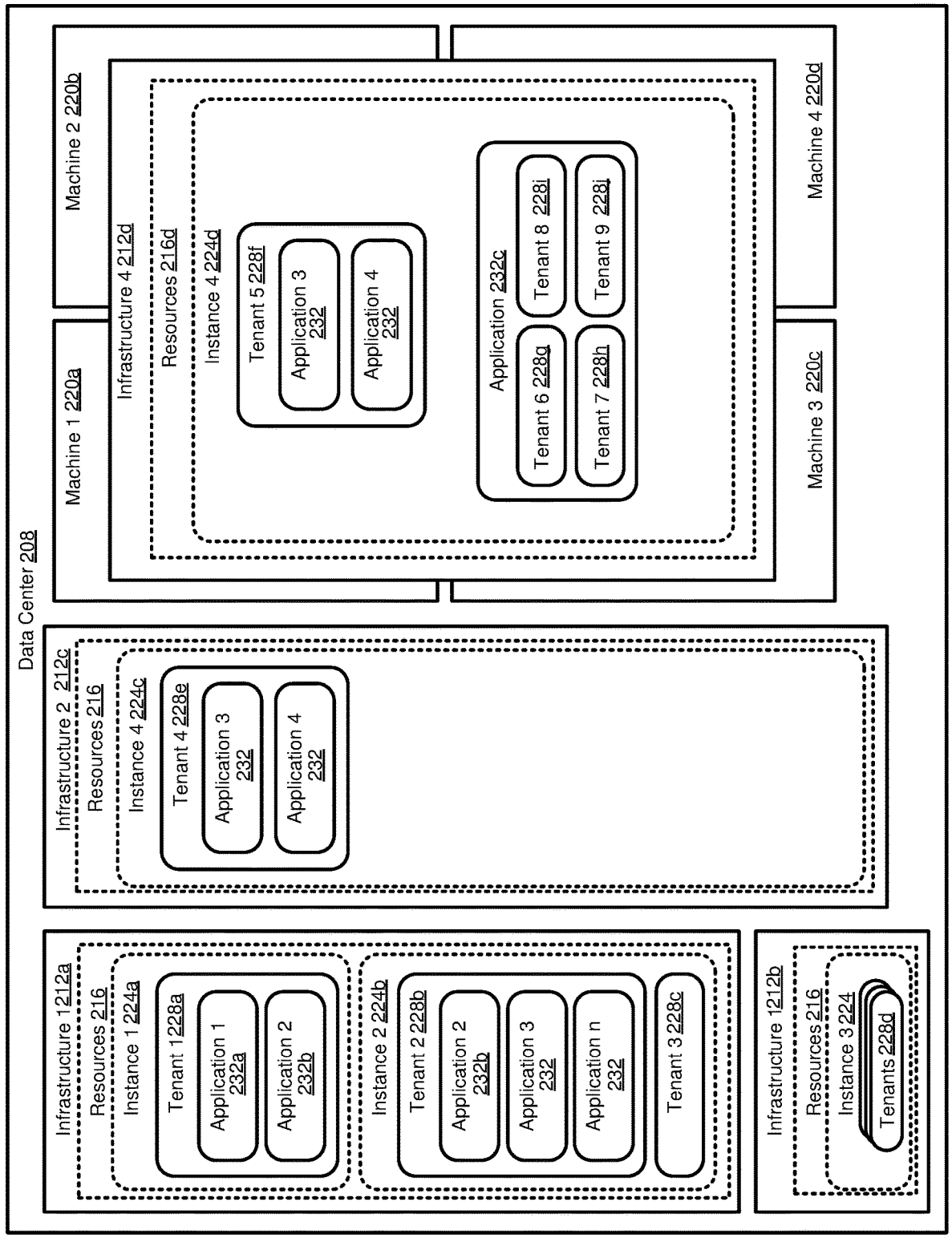
FIG. 2 is a diagram illustrating a cloud computing environment having a plurality of computing infrastructures illustrating different configuration rules for deploying tenant data to the plurality of computing infrastructures.

Example 3—Example Data Center Infrastructures with Tenants Deployed According to Different Deployment Rules FIG. 2 illustrates an example implementation of a data center 208, which can be one of the data centers 112 of FIG. 1. The data center 208 can include a plurality of computing infrastructures (e.g., one or more devices or machines) 212. In some cases, the infrastructures 212 can be operated individually/as individual machines, such as shown for infrastructures 212a, 212b. In these cases, an infrastructure 212 has resources (i.e., computing resources) 216 that are limited to the physical resources of the given machine. In other cases, the resources of multiple machines 220 (e.g., machines 220a-220d) can be pooled as a single infrastructure 212d having resources 216d, which infrastructure may be considered as a cluster (which can implement, for example, a distributed database system).

A given infrastructure 212 can host one or more database instances 224. For example, infrastructure 212a hosts two instances 224a, 224b, while infrastructures 212c, 212d each host a single instance, instances 224c, 224d, respectively. Each instance 224 can host one or more tenants 228. Infrastructure 212a is shown as having a single tenant 228a in instance 212a, and two tenants 228b, 228c in instance 212b. Infrastructure 212b is generically shown with multiple tenants 228d, while infrastructure 212c is shown with a single tenant 228e in its single instance 224c. Infrastructure 212d is shown with multiple tenants 228f-228j.

An infrastructure 212 can host one or more applications 232, or at least data associated with one or more applications. Typically, an infrastructure 212 hosts an application 232, such as an application that uses data stored/managed by a data management system also installed on the infrastructure. At least a portion of data used by the application 232 is also stored on the same infrastructure 212 as the application.

Tenants 228a-228f are shown with "tenant" being the primarily organizing unit. That is, each tenant 228 of tenants 228a-208f is shown as having data associated with one or more applications 232 deployed on the same infrastructure 212 and instance 224. In contrast, tenants 228g-228j are shown as organized by a particular application 232c, with "application" being the primary organizing unit. As will be further described, the "organizing unit" can be used to determine what data (e.g., for what tenants and what applications) will be stored on a given infrastructure 212. That is, for example, the organizing unit of "tenant" can be used to determine that data (including for multiple applications 232) for tenant 1, 228a, should be stored on the same infrastructure 1, 212a.

Such data on infrastructure 212a can be organized or partitioned in various manners. That is, a configuration rule may determine on which infrastructure 212 (and instance 224) tenant data should be located, but the data may be organized on the infrastructure in another manner. For example, if infrastructure 212a, for a given application 232, say application 232b, stores data for multiple tenants 228 (e.g., 228a, 228b as shown), the data can be stored in a repository associated with the application. Or, data can be stored in repositories for particular tenants 228, such as having data for multiple applications 232 be stored in a common tenant repository. Or, data can be stored in separate repositories for each tenant 228 and each application 232. "Storing" data in a common repository can refer to storing data in a common logical organization, a common physical location, or both.

The data center 208 is shown having data distributed according to two regimes. The first regime is deploy data for all tenant applications 232 (that is, all applications used by a given tenant 228), at least for applications meeting particular criteria (e.g., applications associated with a particular visualization or analytic engine, where it may be desired to facilitate the visualization or analytic engine, or application, having access to tenant data from multiple applications), in a given instance 224a as long as possible, where "as long as possible" means as long as sufficient resources 216 are available for the instance. The second regime is to deploy all tenants 228 for a given application 232 to the same instance 224 as long as possible. Tenants 228a-228f are shown as deployed according to the first regime, while application 232c has data for tenants 228g-228j deployed according to the second regime.

The resources 216 of the infrastructures 212, can be different. For example, the resources 216 can be at least generally correlated to the size of the infrastructures 212 in FIG. 2 (of course, for a physical machine, the amount of resources is often not physically correlated to the size of the machine, but is described as such with respect to FIG. 2 for purposes of illustration). That is, infrastructure 212d may have the largest amount of resources 216 of any infrastructure (even though its component machines 220a-220d may have fewer resources than other infrastructures formed from single machines), followed by infrastructure 212c, infrastructure 212a, and finally infrastructure 212b. Note that the amount of resources 216 on a given infrastructure 212 need not be correlated to factors such as the number of instances 224, tenants 228, or applications 232 present on the infrastructure. That is, for example, infrastructure 212c has a single instance 224c and a single tenant 228e, even though it has more resources 216 than infrastructure 212a, which has two instances 224a, 224b and a total of three tenants 228a-228c across the two instances. An infrastructure 212 may have more resources for a variety of reasons, such as because it hosts more applications 232 or tenants 228, or to meet service level goals for particular tenants.

Example 4—Example Computing Environment with Tenant Deployment Service

Figure 3:
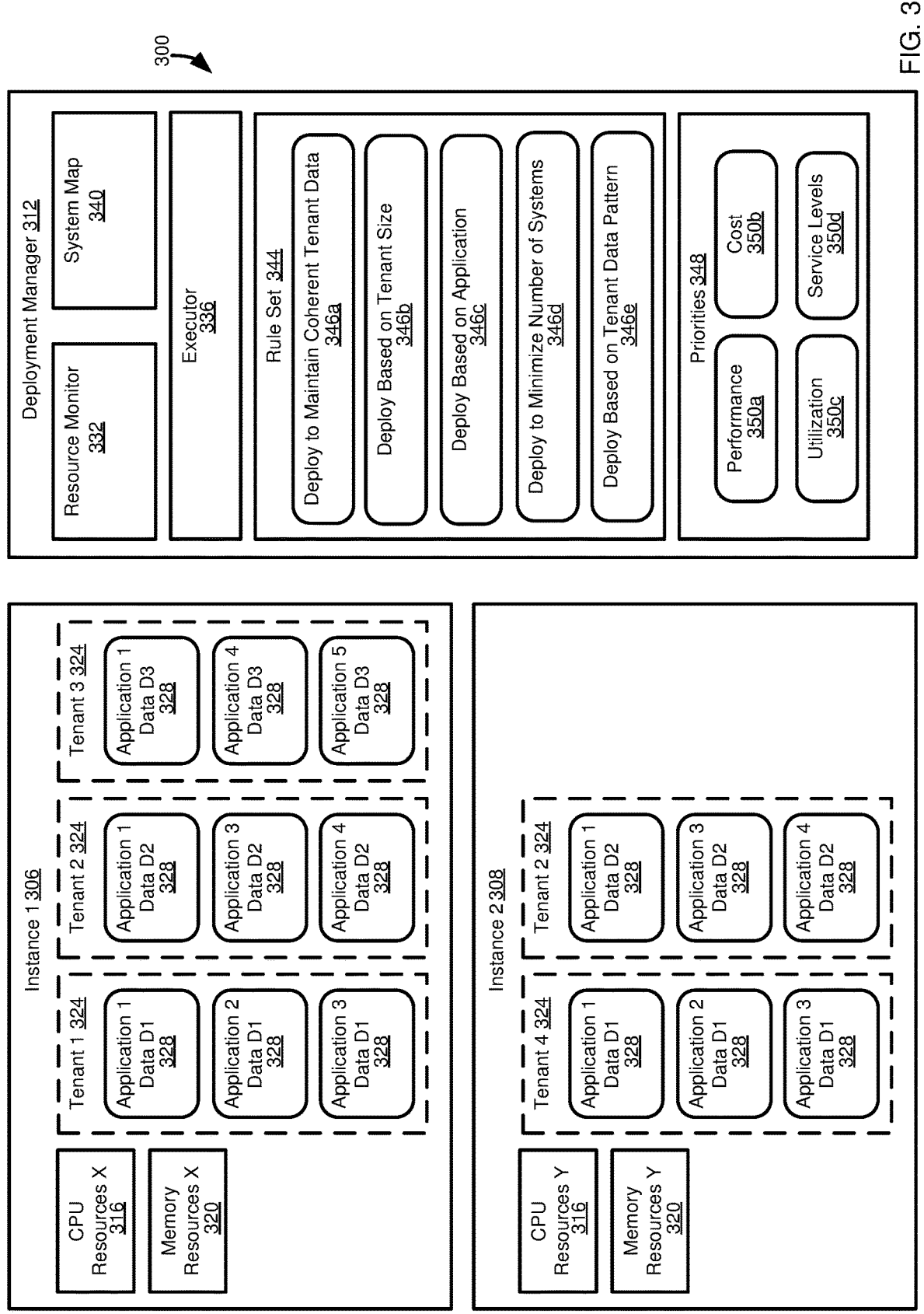
FIG. 3 is a diagram depicting a cloud computing environment having a plurality of computing infrastructures and a tenant deployment service for deploying tenants to, and managing tenants in, the cloud computing environment.

FIG. 3 illustrates an example computing environment 300 in which disclosed technologies can be implemented. The computing environment 300 can represent all or a portion of computing infrastructures in a data center, and generally includes a first database instance 306, a second database instance 308, and a deployment manager 312. The database instances 306, 308 are associated with respective computing resources, in the form of CPU resources 316 and memory resources 320. The instances 306, 308 may each be installed on computing infrastructure having one or more machines, and may be the sole instance installed on the infrastructure, or may be one of multiple instances installed on the infrastructure. The CPU resources 316 and memory resources 320 can represent all of such resources available on a particular computing infrastructure, or can represent a portion of such resources that have been allocated to, or made available for use by, a respective instance 306, 308.

Each of the instances 306, 308 can host data associated with one or more tenants 324 and one or more applications, which are associated with tenant application data 328. The number and arrangement of instances 306, 308, tenants 324, and applications 328 (tenant application data) in FIG. 3 is provided as an illustrative example. The number and arrangement of instances 306, 308, tenants 324, and applications 328 (tenant application data) may vary as desired, including according to various configuration rules described in the present disclosure, which rules may be administered by the deployment manager 312.

The deployment manager 312 can be responsible for the configuration of various aspects of the computing environment 300, including:
  A number of instances to host on a given computing infrastructure;
  The formation or disassociation of clusters;
  A number of tenants to host on a particular instance, and the identity of such tenants;
  A number of applications whose data is to be hosted on a particular instance, and the identity of such applications;
  While rules should be used to configure the above parameters, including prioritizing various rules or rule parameters (e.g., optimize cost, performance, scalability, etc.);
  Determining a startup configuration;
  Determining whether any configuration changes should be made based on operational parameters, such as memory use or resource use;
  Determining how new tenants or tenant data for a new application data should be deployed;
  Determine when to create or remove database instances or application instances, and in some cases to add computing resources to or remove computing resources from a computing infrastructure;
  Determining any configuration changes that should be made if tenants or application data is removed from a computing environment;

The deployment manager 312 can include various components to assist in managing the computing environment 300. For example, the deployment manager 312 can include a resource monitor 332. The resource monitor 332 can be in communication with the instances 306, 308, or the computing infrastructure on which the instances are installed. The resource monitor 332 can receive information regarding the use of CPU resources 316 or memory resources 320. In some cases, the resources monitor 332 can periodically poll the instances 306, 308 (or their underlying computing infrastructure), while in other cases, the instances (or computing infrastructure) can periodically send updates. In further implementations, both push and pull mechanisms can be used to update resource information at the resource monitor 332. The update frequency can be selected to update at set intervals, or when significant changes occur (e.g., when a change in resource use, or a resource use threshold, satisfies a threshold or other criteria). Information acquired by the resource monitor 332 can be accessed by other components of the deployment manager 312, such as by an executor 336. The resource monitor 332 can also include trigger criteria (e.g., resource use satisfying a threshold) that can cause the executor 336 to analyze and potentially change a configuration of the environment 300.

The deployment manager 312 can include a system map 340 (also referred to as a computing environment directory). The system map 340 can store information regarding various components of the computing environment 300. For example, the system map 340 can store information regarding available machines, infrastructures, instances, tenants, and applications. The system map 340 can include information about computing resources available on various machines, infrastructures, or instances, or used by particular tenants 324 or applications 328. The system map 340 can be updated by the resource monitor 332 to include current resource use levels, which can be used to determine an amount of available resources on a particular infrastructure or instance. The system map 340 can be maintained in a data structure, such as a table, list, graph, heap, tree, array, or other data structure. The system map 340 can be kept in memory, and can also be persisted.

The system map 340 and the resource monitor 332 can be accessed by the executor 336. The executor 336 can determine how tenants or applications should be added to the environment 300, such as on which instance a particular tenant or application should be deployed. The executor 336 can also determine if/how a configuration of the environment 300 should be changed based on resource use, such as if tenants or applications should be moved within the environment 300, or if resources should be added to, or removed from, particular computing infrastructure. The executor 336 can also be responsible for installing or uninstalling application instances, or for creating or removing database instances.

In making configuration determinations, the executor 336 can access a rule set 344 and, optionally, a set of priorities 348. The rule set 344 can include or more rules 346 that can be used to configure deployments of tenants and applications in the environment 300. The rule set 344 at least includes a rule 346*a* to deploy all applications (or selected applications or applications having an identified class, such as identified in metadata, or whose identifier is in a list of applications for which the rule 346*a* should be applied) to a given instance as long as possible, where as long as possible means as long as the instance has sufficient resources (e.g., memory 320) available. The rule 346*a* can define steps that should be taken when the rule at least initially cannot be complied with, such as steps to move tenants, add resources, form a cluster, etc., as will be further described.

The executor 336 can optionally include additional rules 346 in the rule set 344. Example of other rules include rule 346*b*, to deploy tenants based on size (e.g., designating particular instances as hosting tenants within a set size range), rule 346*c*, to deploy tenants based on the application with which the data is associated (e.g., minimize the number of application installations by putting data for different tenants on the same instance, even if that results in some tenant data being on a different instance), rule 346*d*, to deploy tenants and applications so as to minimize the number of machines or instances that are instantiated, or a rule 346*e* to deploy tenants based on their data use pattern (such as having only cloud-hosted data or a mix of cloud-hosted data and local data).

In selecting a rule 346 of the rule set 344, prioritizing rules, or implementing rules, the executor 336 can consider one or more priorities 350 of a priority set 348. Priorities 350 can include considerations such as performance 350*a*, cost 350*b*, utilization 350*c*, or service levels 350*d*. For example, the executor 336 can configure the environment 300 using rule 346*a*, but, given a choice of where to place a particular tenant (and data for its associated applications), the executor can consider any, or multiple (including all) of the priorities 350. Similarly, given a set of multiple options for configuring a system according to rule 346*a*, the executor 336 can consider another rule, such as rule 346*b*.

Example 5—Example Tenant Deployment and Management Operations

Figure 4:
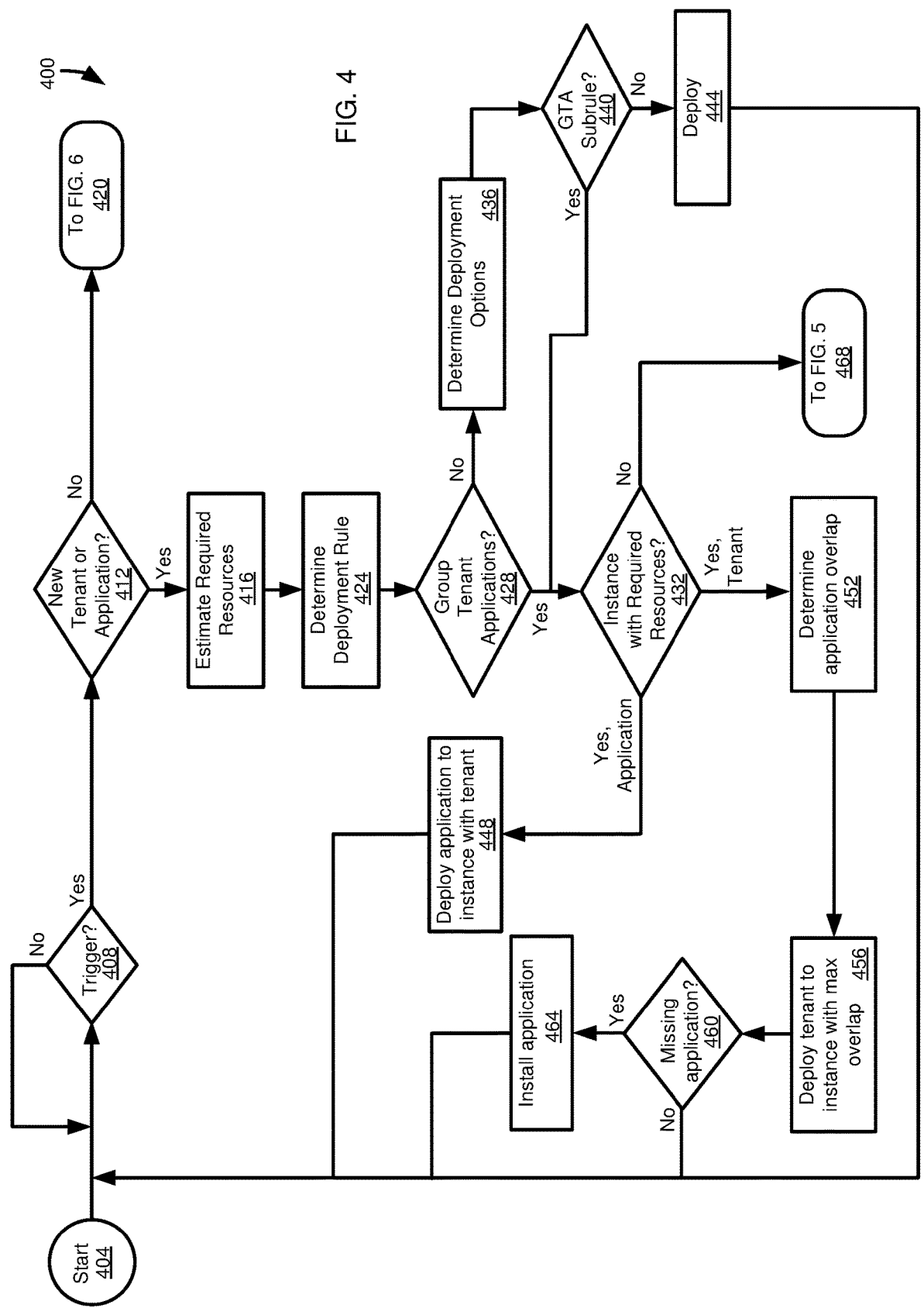
FIGS. 4-6 are flowcharts illustrating operations in a disclosed method of deploying tenants to, and managing tenants in, a cloud computing environment.

FIG. 4 presents a flowchart of a method 400 according to an embodiment of the present disclosure. The method 400 can be carried out using the computing environment 300 of FIG. 3, in particular implementations. The method 400 can be used to carry out various configuration/reconfiguration activities in a computing environment having multiple database instances, tenants, and applications.

The method 400 begins at 404. At 408, it is determined whether a trigger has occurred that causes the method 400 to continue, such as to continue to deploy a new tenant or new tenant data (e.g., tenant data for an additional application), or to reconfigure a computing environment, such as based on changes in the resources used by one or more tenants or applications (e.g., an application being associated with greater or lesser amounts of tenant data, or processing associated with tenant activities). In some cases, the trigger can be input received from a user through a graphical user interface, or can be initiated by a function call. For example, the deployment manager 312 may be associated with an application program interface (API) with calls to perform actions such as add a tenant, remove a tenant, move a tenant, add application access for a tenant, remove application access for a tenant, change priorities used in deployment, change rules used in deployment, change an ordering or priority of rules or priorities used in deployments, etc. The API calls can include arguments such as a tenant identifier, an application identifier, a rule identifier, and the like. If it is determined at 408 that a trigger has not occurred, the method 400 can continue to loop at 408 until a trigger event is detected.

If it is determined at 408 that a trigger event has been detected, the type of trigger event can be determined at 412. If the trigger event is a request or action to add a new tenant (with one or more applications) or to add an application for an existing tenant (e.g., account for tenant application data for the application), the method 400 can proceed to 416. Otherwise, the request or action is to determine whether the computing environment should be reconfigured based on a change in resource use, in which case the method can proceed at 420 to 604 of FIG. 6.

At 416, the amount of resources required to add the tenant or application are estimated or determined. In the event of a tenant to be added, determining the resources for the tenant can include determining an overall amount of memory or processor use required by the tenant, a number and type of applications used by the tenant (including an amount for processor use or memory use for each application), a service level or priority associated with the tenant, and combinations of these factors. In a request to add a tenant, applications to be used by the tenant, resources needed by the tenant, and other deployment criterion can, in some cases, be included as arguments in an API call, such as to the deployment manager 312 of FIG. 3. Determining the resources for a tenant can also include determining characteristics for the tenant, such as whether the tenant has only cloud-hosted data or whether the tenant also uses local data.

At 424, a deployment rule to be used is determined. Determination (or selection) of the deployment rule can, in some cases, take into account the tenant or application requirements or characteristics determined at 416. In other cases, the deployment rule can be set or fixed for the computing environment (e.g., in configuration settings, which at least in some cases can be altered by a sufficiently privileged user). In yet further cases, the deployment rule can be specified in the request or action to add the tenant or application. For example, the deployment rule can be specified in configuration settings (or metadata) for the tenant or application, or in an API call. Or, the tenant or application can be associated with a type or identifier, and a registry can be queried for deployment rules to use with the particular type of tenant or application, or for the particular tenant or application associated with the identifier.

In yet further implementations, determining a deployment rule at 424 can be based in whole or part on priorities that have been set for a computing environment, or a particular database instance, tenant, or application. For example, if a priority such as cost, or maintenance is selected, or given a high priority relative to other considerations, it may be more likely that a rule of "minimize a number of application deployments" may be selected, or used to select between options that are identified as equivalent using another rule. Consistently, selecting a rule at 424 may include selecting a plurality of rules, optionally including setting different priorities for rules of the plurality of rules.

At 428, it is determined whether a selected or a highest priority rule is to deploy all applications (or applications of a set of applications) of a particular tenant to the same database instance, such as to facilitate access by analytics or visualization applications to tenant data associated with multiple applications. If "deploy all applications of the same tenant to the same instance" is the selected or highest priority rule, the method 400 can proceed to 432. If a different rule is selected or given the highest priority, the method 400 can proceed to 436 where deployment of the application or tenant can be carried out according to the other rule. In the event it is determined at 440 that the rule provides multiple deployment options, and "maintain applications for one tenant together" is used to determine a deployment to be used, or to otherwise rank or evaluate the deployments, the method 400 can proceed to 432 to evaluate the possible configurations produced at 436. Otherwise, if the "maintain applications for one tenant together" rule is not used, the method 400 can return to 408 after the configuration is selected at 436 and the tenant or application has been suitably deployed at 444.

At 432, it is determined whether a database instance of the computing environment includes sufficient resources to host the tenant or application to be added. If at least one instance is identified that has sufficient resources for the tenant or application, the method can proceed to 452 if a tenant is being added, or to 448 if an application is being added. At 448, the application is deployed to the instance where the tenant data is maintained (e.g., with the data for other applications used by the tenant). The application can be installed to the instance, if not already present. The method 400 can then return to 408.

At 452, the applications used by the tenant are analyzed and compared with applications installed on the instance or instances that have sufficient resources. Typically, the tenant is deployed to the instance that has the largest number of applications installed that overlap with applications used by the tenant. The tenant, including data for all applications used by the tenant, can be deployed to the selected instance at 456. If it is determined at 460 that one or more applications needed by the tenant are not installed on the selected instance, such applications can be installed at 464. The method 400 can then return to 408. Otherwise, the method 400 can proceed from 460 to 408.

Figure 5:
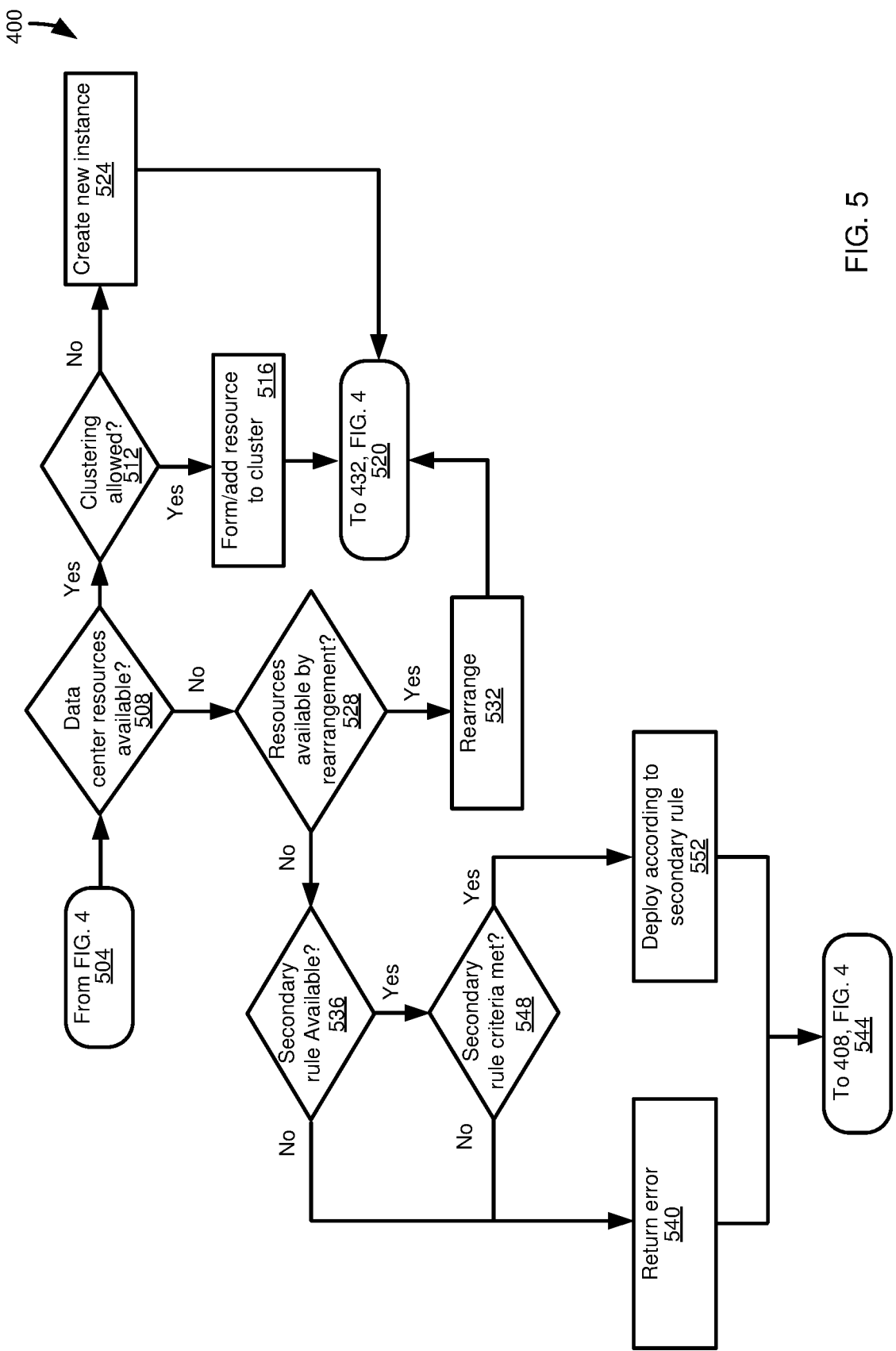

If it was determined at 432 that the environment does not include an instance with sufficient resources for the tenant or application, the operations can proceed at 468 to 504 of FIG. 5.

Turning now to FIG. 5, the operations 400 continue from 468 at 504. At 508 it is determined whether the computing environment (e.g., data center) includes sufficient resources to create a new database instance or to add resources to an existing instance (e.g., by consulting a system map or computing environment directory). Resources may be machines that are not currently in use, or which can be redirected from another purpose. For example, the computing environment in which the method 400 is carried out can be a computer network that is built from a subset of machines available in a data center, where the data center may include other computing environments that may be used for other purposes, such as providing other applications or acting as web servers. In the event that a machine or cluster hosts multiple instances, or has uncommitted resources, to the extent resources can be allocated from one instance to another on the same machine or cluster, or can be set to a committed status for the instance or tenant being added, such resources can be considered available resources of the computing environment.

If it is determined at 508 that the computing environment has sufficient resources available, at 512, it can be determined whether the computing environment allows for clustering (for example, a distributed database system). If so, at least a sufficient portion of the available resources are added to form a cluster or augment a cluster or individual machine at 516. At 520, the method can return to the operations shown in FIG. 4, such as to 432.

If it is determined at 512 that clustering is not allowed, a new instance can be created on an existing computing infrastructure at 524. The method 400 can then proceed to 520. The operations associated with 512, 524 can be carried out in a different manner, including order, if desired. For example, it may be determined at 512 whether a new instance can be created, and clustering only pursued if the new instance cannot be created. More generally, 512 can involve determining whether to add resources to an existing instance (including by clustering) or to create a new instance. This determination can include calculating an expected performance using each approach and selecting the approach that provides the highest level of performance. The determination can also include factors such as determining whether a new cluster would need to be created or if additional resources can be added to an existing cluster. Often, it can be more complex to create a cluster than to add resources to an existing cluster, and can be more complex to create or modify a cluster than to create an independent instance. However, creating a cluster may provide other benefits (which can be priorities considered by the method 400), such as providing for high availability and certain performance enhancements, such as load balancing.

If it was determined at 508 that resources are not available for the new tenant or application, it can be determined at 528 whether existing tenants or applications can be rearranged in the computing environment to create an instance with sufficient resources (e.g., by consulting a system map or computing environment directory). For example, assume a computing environment has first and second machines with identical resources, and each machine has a single tenant using half of the available resources. Assume that a new tenant is to be added that needs 60% of the resources of a machine. At 508, it would be determined that the computing environment does not have sufficient resources to accommodate the tenant. However, at 528 it would be determined that the tenant of the first machine could be relocated to the second machine, which would create sufficient resources for the new tenant on the first machine.

In at least some implementations, 528 is carried out, at least initially, using the principle of keeping all applications of a single tenant together (or, at least applications that might be associated with a visualization or analytics application, which applications can be stored in a list or otherwise associated with an identifier, such as in metadata for the application, that indicates that keeping tenant application data in a common instance is a priority, including providing a level or other indicator of relative importance for maintaining application data on a common instance). Thus, continuing the above example, 528 would involve determining whether the second machine has sufficient resources to host all tenant applications of the first machine's tenant, not merely one or a subset of such applications. Tenants who would be candidates for being moved to another instance would be those where another instance has sufficient resources for that tenant. In some cases, multiple tenant moves may be needed to accommodate a new tenant or application.

If it is determined at 528 that sufficient resources can be made available by rearranging tenants in the computing environment, the rearrangement can be implemented at 532, and the method 400 can then proceed to 520, where it returns to the operations of FIG. 4. Additional actions can be taken prior to rearrangement at 532. For example, if multiple rearrangement options are determined at 528, an option of such options can be selected using one or more additional rules, based on one or more priorities, or based on a combination of additional rules and priorities.

If it is determined at 528 that sufficient space cannot be made available by rearranging tenants in the computing environment, it can be determined at 536 whether a secondary rule is available. That is, the computing environment can be managed such that configuration is first attempted using the rule of "keep all tenant applications on the same instance." If that rule cannot be satisfied using computing environment resources, the computing environment can be configured according to another principle, such as "reduce the number of application instances." If multiple instances with resources are available, or can be made available by rearrangement, an instance can be selected based on one or more other rules, priorities, or a combination thereof. Or, for example, a tenant or application can simply be deployed to any available instance that has sufficient resources, or to the instance with resources, if only one such instance is available.

At 536, if no secondary rule is available, an error can be returned at 540, and the method 400 can return to 408 of FIG. 4 at 544. If a secondary rule is available, it is determined at 548 whether the secondary rule criteria are met. If the criteria for the secondary rule are not met, the method 400 can proceed to 540. If the criteria for the secondary rule are met, the tenant or instance can be deployed according to the secondary rule at 552, and the method 400 can proceed to 544.

Figure 6:
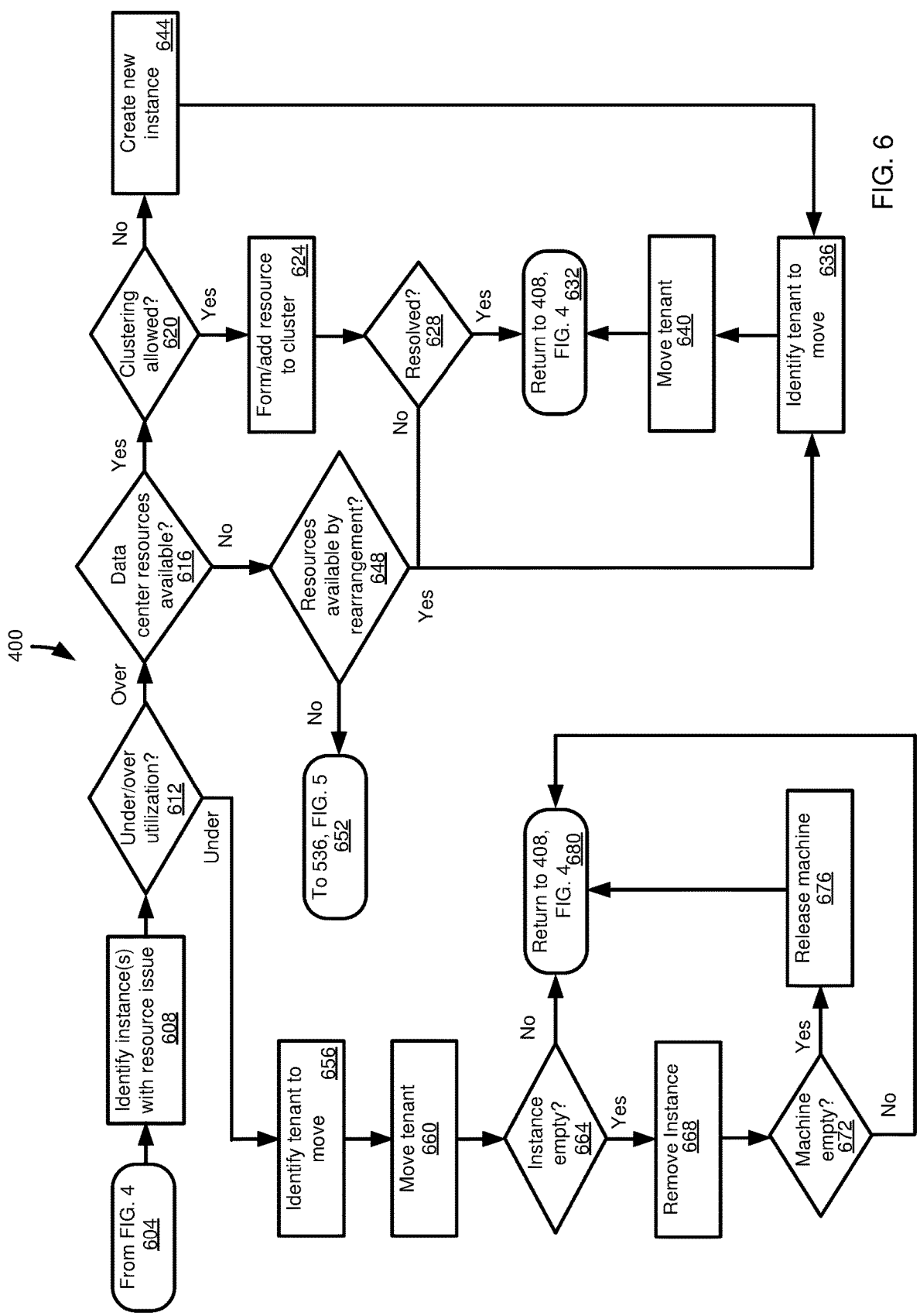

Turning to FIG. 6, the operations 400 continue at 604 from 420 of FIG. 4, in response to determining that the trigger at 408 was a change in resource use in the computing environment. At 608 the instance or instances that are associated with the trigger are determined. In the event that multiple instances resulted in the trigger, the remaining operations of FIG. 6 can be carried out (serially or in parallel) for each instance, or one or more instances may be jointly considered in a single operation.

It is determined at 612 whether a given instance associated with the trigger is associated with resource overutilization or underutilization. If the instance is associated with resource overutilization, the method 400 proceeds to 616, where a subprocess at least similar to 508, 512, 516, 520, 524 of FIG. 5 can determine whether computing environment (e.g., data center) resources are available (e.g., by consulting a system map or computing environment directory), and if so, make a suitable redeployment of one or more tenants, applications, or a combination thereof. If resources are determined to be available at 616, it can be determined at 620 whether clustering is allowed (e.g., by consulting a system map or computing environment directory). If clustering is allowed, a cluster can be formed, or resources can be added to a cluster, at 624. It can be determined at 628 whether creating a cluster or adding resources to a cluster resolved the resource issue of the identified instance. If the resources were added to a machine to form a cluster, or added to a cluster with the resource issue, the resource issue may be resolved, in which case the method 400 can proceed to 632, where the operations can return to 408 of FIG. 4.

If the resource use issue is determined at 628 not to be resolved, such as resources being added to a machine or cluster other than that on which the resource use issue occurred, the method 400 can proceed to 636. At 636 a tenant can be identified to be moved to the cluster which was formed, or to which resources were added. The tenant can be selected such that all application data associated with the tenant will be moved. The tenant can be moved at 640, and the method 400 can then proceed to 632.

If it is determined at 620 that clustering is not allowed, a new instance can be created at 644. One or more tenants to be moved to the new instance can be identified at 636, and the method 400 can then continue as previously described. As discussed with respect to FIG. 5, determining whether clustering is allowed at 620 and creating a new instance at 644 can be carried out in a different order, or can be combined into a single determination step that takes other factors into consideration in determining whether to create a new instance or to create, or add resources to, a cluster.

If resources in the computing environment are determined at 616 not to be available, it can be determined at 648 whether resources can be made available by rearranging elements (e.g., tenants or applications) of the computing environment, which can be carried out analogously as described with respect to decision 528 of FIG. 5 (e.g., by consulting a system map or computing environment directory). Again, in considering what rearrangements may be made, the rule is followed of keeping all applications of the same tenant on the same instance. If resources cannot be made available by rearrangement, the method 400 can proceed to 536 of FIG. 5, to determine whether a secondary rule is available.

Returning to 612, if it was determined that the trigger is based on resource underutilization, the method 400 can identify one or more tenants or applications (e.g., tenant data for a given application) to move at 656. Moving tenants or tenant application data may be used to better balance out resource use among various instances, or better comply with various configuration rules. For instance, if the "keep all applications of a tenant together" rule was violated based on prior resource constraints, 656 can include reconfiguring the computing environment to comply with the rule. Moving tenants may also be used to consolidate tenants, which can be used to reduce the number of active instances or instances of a particular application, which can reduce, for example, maintenance and update efforts. The identified tenant (or application) is moved at 660. At 664, it is determined whether the instance is empty (e.g., no tenants are deployed to the instance). If the instance is empty, it can be removed at 668. At 672, if the machine on which the instance was hosted is empty, it can be released for other uses at 676, and then the method 400 can return to 408 of FIG. 4 at 680. If the instance is determined at 664 not to be empty, or the machine (or cluster) is determined not to be empty at 672, the method 400 can return to 408 of FIG. 4 at 680.

Example 6—Example Tenant Deployment Methods

FIG. 7 illustrates a flowchart of operations 700 for deploying a tenant to an infrastructure of a cloud computing environment. The operations 700 can be carried out, in a particular implementation, in the computing environment 300 of FIG. 3 (such as by the executor 336). At 704, a request is received to deploy a first tenant to a cloud computing environment that includes first and second computing infrastructures. The first tenant is designated to have access to a first plurality of cloud-based software applications. The first computing infrastructure includes a first instance of a first cloud-based software application and a first instance of a second cloud-based software application. The second computing infrastructure includes a second instance of the first cloud-based software application. The first cloud-based software application is different than the second cloud-based software application.

Identities of cloud-based software applications of the first plurality of cloud-based software applications are determined at 708. At 712, it is determined that the first plurality of cloud-based software applications includes the first cloud-based software application and the second cloud-based software application. Based on the determining that the first plurality of cloud-based software applications includes the first cloud-based software application and the second cloud-based software application, the first tenant is deployed to the first computing infrastructure at 716.

FIG. 8 illustrates a flowchart of operations 800 for deploying a tenant to an infrastructure of a cloud computing environment. The operations 800 can be carried out, in a particular implementation, in the computing environment 300 of FIG. 3 (such as by the executor 336). At 804, a request is received to add a first tenant to the cloud computing environment. The request specifies a first plurality of cloud-based software applications to be used by the first tenant. A request is sent at 808 to a tenant deployment service (e.g., the deployment manager 312 of FIG. 3) to determine a computing infrastructure on which the first tenant should be deployed. At 812, at least a first cloud-based software application and at least a second cloud-based software application are identified whose data for the first tenant is designated to be maintained on a common computing infrastructure of the plurality of computing infrastructures.

The tenant deployment service, at 816, determines one or more computing infrastructures of the plurality of computing infrastructures that provide instances of the first cloud-based software application and the second cloud-based software application (such as by consulting a computing environment directory). At 820, the tenant deployment service determines at least a second computing infrastructure of the one or more computing infrastructures that has sufficient available computing resources to host the first tenant. The first tenant is deployed to the at least a second computing infrastructure at 824.

Figure 9:
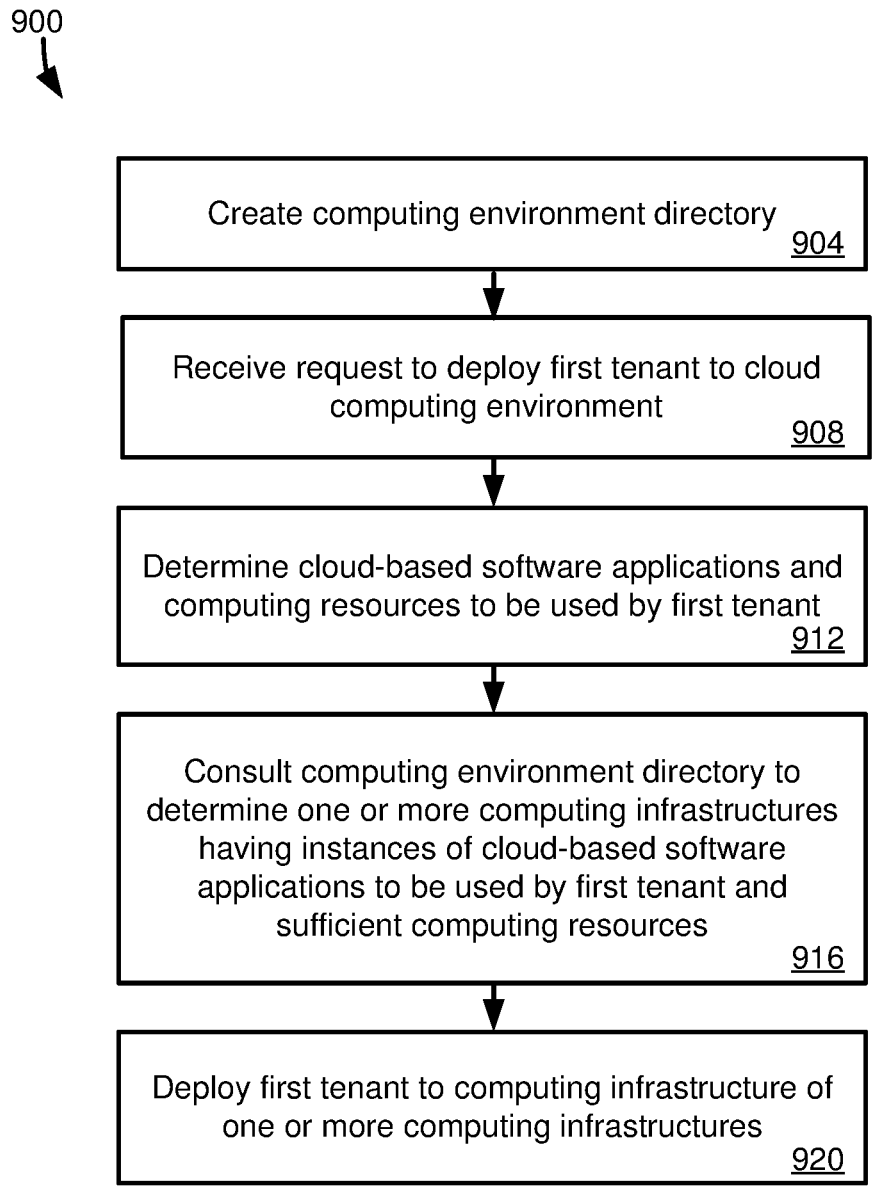
FIG. 9 is a flowchart illustrating operations for deploying a tenant to a cloud computing environment according to a method that accesses a computing environment directory.

FIG. 9 illustrates a flowchart of operations 900 for deploying a tenant to an infrastructure of a cloud computing environment. The operations 900 can be carried out, in a particular implementation, in the computing environment 300 of FIG. 3 (such as, at least in part, by the executor 336). At 904, a computing environment directory (e.g., the system map 340) is created that includes identifiers for a plurality of computing infrastructures of a cloud computing environment, information sufficient to determine available computing resources of respective computing infrastructures, and identifiers of a plurality of cloud-based software applications installed on respective computing infrastructures. A request is received at 908 to deploy a first tenant to the cloud computing environment. At 912, cloud-based software applications to be used by the first tenant and computing resources required by the first tenant are determined. The computing environment directory is consulted at 916 to determine one or more of the plurality of computing infrastructures having instances of the cloud-based software applications to be used by the first tenant and having sufficient computing resources to satisfy the computing resources required by the first tenant. The first tenant is deployed at 920 to a computing infrastructure of the one or more computing infrastructures.

Example 7—Computing Systems

Figure 10:
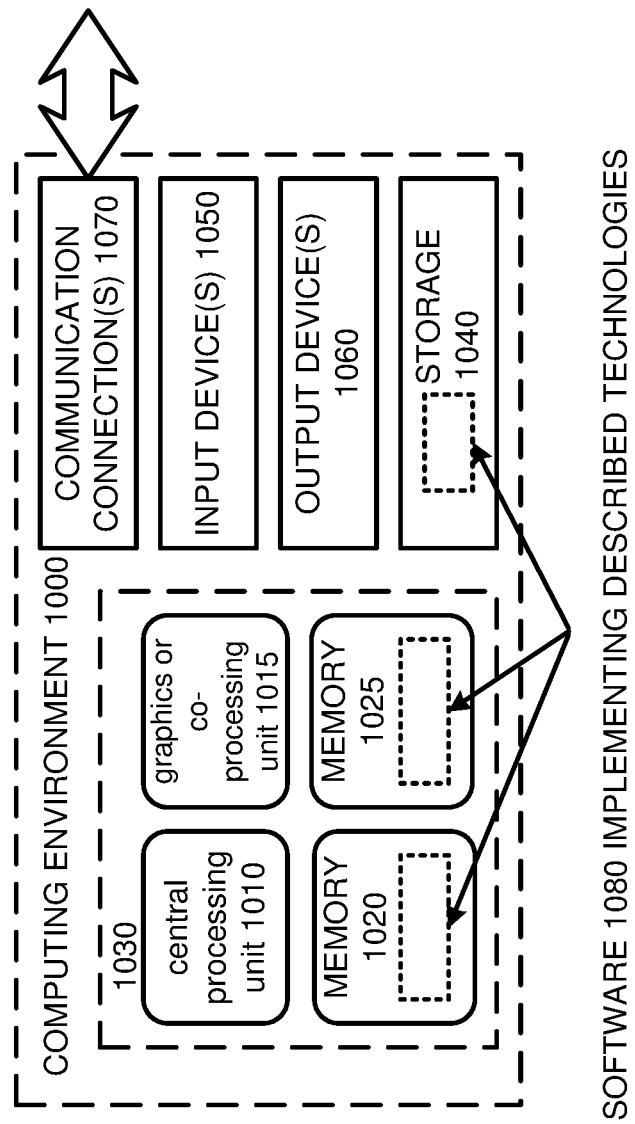
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the features described in Examples 1-6. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070, including input devices, output devices, and communication connections for interacting with a user. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8—Cloud Computing Environment

Figure 11:
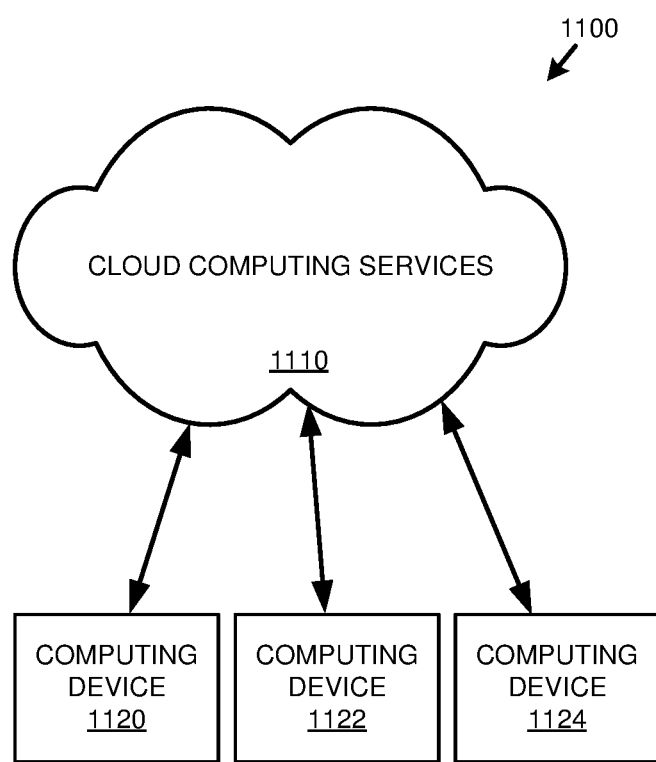
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operations (e.g., data processing, data storage, and the like).

Example 9—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a cloud computing environment, the cloud computing environment comprising (1) a plurality of multi-tenant cloud-based software applications, (2) a first computing infrastructure providing (i) a first instance of a first multi-tenant cloud-based software application of the plurality of multi-tenant cloud-based software applications, and (ii) a first instance of a second multi-tenant cloud-based software application of the plurality of multi-tenant cloud-based software applications, the second multi-tenant cloud-based software application being different than the first multi-tenant cloud-based software application, and (3) a second computing infrastructure providing a second instance of the first multi-tenant cloud-based software application, the method comprising:
    receiving a request to deploy a first tenant to the cloud computing environment, the first tenant comprising a plurality of users and designated to have access to multiple multi-tenant cloud-based software applications of the plurality of multi-tenant cloud-based software applications;
    determining identities of the multiple multi-tenant cloud-based software applications; determining that the multiple multi-tenant cloud-based software applications comprise
    the first multi-tenant cloud-based software application and the second multi-tenant cloud-based software application, at least the first multi-tenant cloud-based software application being deployed on the first computing infrastructure or the second computing infrastructure for use by at least one existing tenant prior to the receiving the request;
    based at least in part on determining that the multiple multi-tenant cloud-based software applications comprises the first multi-tenant cloud-based software application and the second multi-tenant cloud-based software application, and that the second computing infrastructure does not comprise the second multi-tenant cloud-based software application, deploying the first tenant to the first computing infrastructure;
    wherein deploying the first tenant to the first computing infrastructure comprises
    (1) making the first multi-tenant cloud based software application and the second multi-tenant cloud-based software application available on the first computing infrastructure to users associated with the first tenant; and (2) configuring the first computing infrastructure to store data associated with the first tenant and the first multi-tenant cloud-based software application and the second multi-tenant cloud-based software application;
    receiving a request from a user of the plurality users of the first tenant that requests data from both the first multi-tenant cloud-based software application and the second multi-tenant cloud-based software application;
    retrieving the data from the first computing infrastructure; and returning the data to the user in response to the request.

2. The method of claim 1, further comprising:
    receiving a request to provide the first tenant with access to a third multi-tenant cloud-based software application of the plurality of multi-tenant cloud-based software applications, the third multi-tenant cloud-based software application being different than the first multi-tenant cloud-based software application and the second multi-tenant cloud-based software application;
    determining that the third multi-tenant cloud-based software application is not installed on the first computing infrastructure; and
    deploying a first instance of the third multi-tenant cloud-based software application to the first computing infrastructure.

3. The method of claim 2, further comprising:
    prior to deploying the first instance of the third multi-tenant cloud-based software application:
        retrieving a configuration policy for the cloud computing environment; and
        from the configuration policy, determining that the third multi-tenant cloud-based software application is deployable on the first computing infrastructure;
        wherein the deploying the first instance of the third multi-tenant cloud-based software application is carried out in response to the determining that the third multi-tenant cloud-based software application is deployable on the first computing infrastructure.

4. The method of claim 1, further comprising:
    receiving a request to provide the first tenant with access to a third multi-tenant cloud-based software application of the plurality of multi-tenant cloud-based software applications, the third multi-tenant cloud-based software application being different than the first multi-tenant cloud-based software application and the second multi-tenant cloud-based software application;
    determining that the third multi-tenant cloud-based software application is not installed on the first computing infrastructure;
    determining that the second computing infrastructure comprises the first multi-tenant cloud-based software application, the second multi-tenant cloud-based software application, and the third multi-tenant cloud-based software application; and
    based on determining that the second computing infrastructure comprises the first multi-tenant cloud-based software application, the second multi-tenant cloud-based software application, and the third multi-tenant cloud-based software application, migrating the first tenant from the first computing infrastructure to the second computing infrastructure.

5. The method of claim 1, further comprising:
- determining that the first computing infrastructure does not comprise sufficient computing resources to host the first tenant; and
- freeing sufficient computing resources on the first computing infrastructure to satisfy computing resource needs for all multi-tenant cloud-based software applications provided to the first tenant in the cloud computing environment.

6. The method of claim 1, further comprising:
- determining that the first computing infrastructure does not comprise sufficient computing resources to host the first tenant; and
- adding sufficient computing resources to the first computing infrastructure to satisfy computing resource needs for all multi-tenant cloud-based software applications provided to the first tenant in the cloud computing environment.

7. The method of claim 6 wherein adding sufficient computing resources comprises adding a computing device to a cluster comprising the first computing infrastructure.

8. The method of claim 1, further comprising:
- determining that the first computing infrastructure does not comprise sufficient computing resources to host the first tenant;
- identifying a third computing infrastructure, which can be the second computing infrastructure, having sufficient computing resources to satisfy all computing resource needs for all multi-tenant cloud-based software applications provided to the first tenant in the cloud computing environment; and
- transferring the first tenant, including data associated with each multi-tenant cloud-based software application provided to the first tenant in the cloud computing environment, to the third computing infrastructure.

9. The method of claim 1, wherein the second computing infrastructure comprises a second instance of the second multi-tenant cloud-based software application, and wherein the first computing infrastructure and the second computing infrastructure each comprise the multiple multi-tenant cloud-based software applications of cloud-based applications consists of the first multi-tenant cloud-based software application and the second multi-tenant cloud-based software application, the method further comprising:
- determining that the second computing infrastructure comprises the first multi-tenant cloud-based software application and the second multi-tenant cloud-based software application;
- determining that the first tenant may be deployed to the first computing infrastructure or the second computing infrastructure; and
- selecting the first computing infrastructure for deployment of the first tenant based on a deployment rule.

10. The method of claim 9, wherein the deployment rule is based on computing resource needs of a tenant to be deployed, and wherein the first computing infrastructure and the second computing infrastructure are associated with different tenant size ranges and the first tenant is within a size range of the first computing infrastructure and is not within a size range of the second computing infrastructure.

11. The method of claim 1, wherein the deploying is based on a configuration rule to keep data for all multi-tenant cloud-based software applications of the first tenant provided by the cloud computing environment on common computing infrastructure.

12. The method of claim 1, wherein the first computing infrastructure provides a first instance of a third multi-tenant cloud-based software application and the second computing infrastructure does not provide an instance of the third multi-tenant cloud-based software application, the method further comprising:
- receiving a request to deploy a second tenant to the cloud computing environment, the second tenant designated to have access to a first set of multiple multi-tenant cloud-based software applications of the plurality of multi-tenant cloud-based software applications;
- determining identities of the multi-tenant cloud-based software applications of the first set of multiple multi-tenant cloud-based software applications of the plurality of multi-tenant cloud-based software applications;
- determining that the first set of multiple multi-tenant cloud-based software applications of the plurality of multi-tenant cloud-based software applications comprises the first multi-tenant cloud-based software application and the third multi-tenant cloud-based software application; and
- based on determining that the first set of multi-tenant cloud-based software applications comprises the first multi-tenant cloud-based software application and the third multi-tenant cloud-based software application and that the second computing infrastructure does not provide an instance of the third multi-tenant cloud-based software application, deploying the second tenant to the first computing infrastructure.

13. The method of claim 1, wherein the first computing infrastructure provides a first instance of a third multi-tenant cloud-based software application and the second computing infrastructure does not provide an instance of the third multi-tenant cloud-based software application, the method further comprising:
- receiving a request to deploy a second tenant to the cloud computing environment, the second tenant designated to have access to a second set of multiple multi-tenant cloud-based software applications of the plurality of multi-tenant cloud-based software applications;
- determining identities of the multi-tenant cloud-based software applications in the second set of multiple multi-tenant cloud-based software applications of the plurality of multi-tenant cloud-based software applications;
- determining that the second set of multiple multi-tenant cloud-based software applications of the plurality of multi-tenant cloud-based software applications comprises the first multi-tenant cloud-based software application and the third multi-tenant cloud-based cloud application, wherein the second computing infrastructure has more available computing resources than the first computing infrastructure; and
- based on determining that the second set of multiple multi-tenant cloud-based software applications of the plurality of multi-tenant cloud-based software applications comprises the first multi-tenant cloud-based software application and the third multi-tenant software-based cloud application and that the second computing infrastructure does not provide an instance of the third multi-tenant cloud-based software application, deploying the second tenant to the first computing infrastructure even though the second computing infrastructure has more available computing resources.

14. The method of claim 1, wherein the second computing infrastructure has more available computing resources that the first computing infrastructure and the second computing infrastructure does not provide an instance of the second multi-tenant cloud-based software application, the first tenant being deployed to the first computing infrastructure even though the second computing infrastructure has more available computing resources.

15. The method of claim 1, further comprising:
determining a plurality of computing infrastructures of the cloud computing environment providing instances of the multiple multi-tenant cloud-based software applications of the plurality of multi-tenant cloud-based software applications;
determining one or more computing infrastructures of the plurality of computing infrastructures having sufficient computing resources to accommodate the first tenant; and
selecting the first computing infrastructure from the one or more computing infrastructures to host the first tenant.

16. The method of claim 1, further comprising:
determining that the first multi-tenant cloud-based software application and the second multi-tenant cloud-based software application are associated with a type specifying that tenant data for the first multi-tenant cloud-based software application and the second multi-tenant cloud-based software application should be maintained on common computing infrastructure of the cloud computing environment.

17. A computing system that implements a cloud computing environment comprising a plurality of computing infrastructures, the computing system comprising:
one or more memories;
one or more processing units coupled to the one or more memories; and
one or more non-transitory computer readable storage media storing instructions that, when loaded into the one or more memories, cause the one or more processing units to perform operations comprising:
receiving a request to add a first tenant to the cloud computing requirement, the request specifying a first plurality of multi-tenant cloud-based software applications to be used by the first tenant;
sending a request to a tenant deployment service to determine a computing infrastructure of the plurality of computing infrastructures on which the first tenant should be deployed;
identifying at least a first multi-tenant cloud-based software application and at least a second multi-tenant cloud-based software application of the first plurality of multi-tenant cloud-based software applications whose data for the first tenant is designated to be maintained on a common computing infrastructure of the plurality of computing infrastructures;
by the tenant deployment service, determining one or more computing infrastructures of the plurality of computing infrastructures that provides instances of the first multi-tenant cloud-based software application and the second multi-tenant cloud-based software application;
by the tenant deployment service, determining at least a first computing infrastructure of one or more computing infrastructures that has sufficient available computing resources to host the first tenant;
deploying the first tenant to the at least a first computing infrastructure;
receiving a request to provide the first tenant with access to a third multi-tenant cloud-based software application, the third multi-tenant cloud-based software application being different than the first multi-tenant cloud-based software application and the second multi-tenant cloud-based software application;
determining that the third multi-tenant cloud-based software application is not installed on the at least a first computing infrastructure;
determining that a second computing infrastructure of the plurality of computing infrastructures comprises the first multi-tenant cloud-based software application, the second multi-tenant cloud-based software application, and the third multi-tenant cloud-based software application; and
based on the determining that the second computing infrastructure comprises the first multi-tenant cloud-based software application, the second multi-tenant cloud-based software application, and the third multi-tenant cloud-based software application, migrating the first tenant from the at least a first computing infrastructure to the second computing infrastructure.

18. The computing system of claim 17, wherein the deploying the first tenant to the at least a first computing infrastructure is performed even though a third computing infrastructure of the plurality of computing infrastructures, that does not have instances of the first plurality of multi-tenant cloud-based software applications to be used by the first tenant, has a greater amount of available computing resources than the at least a first computing infrastructure.

19. One or more computer-readable storage media comprising instructions that, when loaded into one or more memories of one or more computing devices and executed on the one or more computing devices, perform operations providing a tenant deployment service for a cloud computing environment comprising a plurality of computing infrastructures, the operations comprising:
deploying at least a first multi-tenant cloud-based software application of a plurality of multi-tenant cloud-based software applications to a first computing infrastructure of a plurality of computing infrastructures;
deploying the at least a first multi-tenant cloud-based software application to a second computing infrastructure of the plurality of computing infrastructures;
deploying at least a second multi-tenant cloud-based software application of the plurality of multi-tenant cloud-based software applications to the first computing infrastructure of the plurality of computing infrastructures, wherein the second computing infrastructure does not comprise the at least a second multi-tenant cloud-based software application;
creating a computing environment directory comprising identifiers for the plurality of computing infrastructures, information sufficient to determine available computing resources of respective computing infrastructures, and identifiers for instances of the plurality of multi-tenant cloud-based software applications installed on respective computing infrastructures;
receiving a request to deploy a first tenant to the cloud computing environment;
determining a set of one or more multi-tenant cloud-based software applications to be used by the first tenant and computing resources required by the first tenant, the set of one or more multi-tenant cloud-based software applications to be used by the first tenant comprising the at least a first multi-tenant cloud-based software application and the at least a second multi-tenant cloud-based software application;
consulting the computing environment directory to determine one or more of the plurality of computing infrastructures having instances of the multi-tenant cloud-based software applications in the set of one or more multi-tenant cloud-based software applications to be used by the first tenant and having sufficient available computing resources to satisfy the computing resources required by the first tenant; and based at least in part on determining that the first computing infrastructure comprises the plurality of multi-tenant cloud-based software applications of the set of one or more multi-tenant cloud-based software applications to be used by the first tenant, and that the second computing infrastructure does not comprise the at least a second multi-tenant cloud-based software application, deploying the first tenant to the first computing infrastructure, even though the second computing infrastructure has a greater amount of available computing resources than the first computing infrastructure.

20. The one or more computer-readable storage media of claim 19, the operations further comprising:

determining that the first computing infrastructure to which the first tenant was deployed no longer has sufficient computing resource to satisfy updated computing resources required by the first tenant; and adding computing resources to the first computing infrastructure to which the first tenant was deployed or moving the first tenant to another computing infrastructure of one or more computing infrastructures that has instances of the plurality of multi-tenant cloud-based software applications to be used by the first tenant.

* * * * *